(12) United States Patent
Dooley et al.

(10) Patent No.: US 9,044,922 B2
(45) Date of Patent: Jun. 2, 2015

(54) SELF-RELEASING FUSER MEMBERS AND METHODS OF MAKING THE SAME

(75) Inventors: Brynn M. Dooley, Toronto (CA); Yu Qi, Oakville (CA); Carolyn P. Moorlag, Mississauga (CA); Qi Zhang, Milton (CA); Nan-Xing Hu, Oakville (CA)

(73) Assignee: XEROX CORPORATION, Norwalk, CT (US)

(*) Notice: Subject to any disclaimer, the term of this patent is extended or adjusted under 35 U.S.C. 154(b) by 341 days.

(21) Appl. No.: 13/455,796

(22) Filed: Apr. 25, 2012

(65) Prior Publication Data

US 2013/0288059 A1    Oct. 31, 2013

(51) Int. Cl.
| | | |
|---|---|---|
| *B32B 27/00* | (2006.01) | |
| *G03G 15/20* | (2006.01) | |
| *B32B 27/28* | (2006.01) | |

(52) U.S. Cl.
CPC .............. *B32B 27/00* (2013.01); *B32B 27/28* (2013.01); *G03G 15/20* (2013.01); *G03G 15/2057* (2013.01)

(58) Field of Classification Search
CPC ........ B32B 27/28; B32B 27/32; B32B 27/00; B32B 27/304; B32B 27/322; G03G 15/20
USPC .......................................... 428/421; 399/333
See application file for complete search history.

(56) References Cited

U.S. PATENT DOCUMENTS

| | | |
|---|---|---|
| 4,257,699 A | 3/1981 | Lentz |
| 5,017,432 A | 5/1991 | Eddy et al. |
| 5,061,965 A | 10/1991 | Ferguson et al. |
| 5,166,031 A | 11/1992 | Badesha et al. |
| 5,281,506 A | 1/1994 | Badesha et al. |
| 5,366,772 A | 11/1994 | Badesha et al. |
| 5,370,931 A | 12/1994 | Fratangelo et al. |
| 5,945,223 A | 8/1999 | Kuntz et al. |
| 8,231,972 B2 * | 7/2012 | Moorlag et al. ............. 428/421 |
| 8,288,004 B2 * | 10/2012 | Moorlag et al. ............. 428/421 |
| 2007/0054077 A1 * | 3/2007 | Barrese et al. ............. 428/35.7 |
| 2010/0124661 A1 * | 5/2010 | Moorlag et al. ............. 428/421 |

OTHER PUBLICATIONS

Dias et al., "Synthesis of a Two-Dimensional Array of Organic Functional Groups: Surface-Selective Modification of Poly(Vinylidene Fluoride)," American Chemical Society—Macromolecules, 1984, 17, 2529-2531.
Shoichet et al., "Convenient Syntheses of Carboxylic Acid Funetionalized Fluoropolymer Surfaces," American Chemical Society—Macromolecules, 1991, 24, 982-986.

* cited by examiner

*Primary Examiner* — Callie Shosho
*Assistant Examiner* — Patrick English
(74) *Attorney, Agent, or Firm* — MH2 Technology Law Group LLP (57) ABSTRACT

A self-releasing fuser member for an image forming apparatus having a fluoropolymer with fluorocarbon chains bonded to the fluoropolymer via a linking group; a quaternary, tertiary, or secondary carbon atom; and a reactive group. The fluorocarbon chains are oriented nonparallel to the surface of the self-releasing fuser member. Image forming apparatuses having such self-releasing fuser members and methods of making such self-releasing fuser members.

12 Claims, 4 Drawing Sheets

SELF-RELEASING FUSER MEMBERS AND METHODS OF MAKING THE SAME

CROSS-REFERENCE TO RELATED APPLICATIONS

Attention is directed to U.S. patent application Ser. Nos. 12/274,968 and 12/274,988, both filed Nov. 20, 2008, entitled "Fuser Member Coating Having Self-Releasing Fluorocarbon Matrix Outer Layer" and "Fuser Member Coating Having Self-Releasing Fluoropolymer-Fluorocarbon Layer," respectively. The contents of these patent applications are hereby incorporated by reference in their entirety.

BACKGROUND

The disclosed embodiments generally relate to self-releasing fuser members useful in electrostatographic apparatuses. In embodiments, the fuser member can reduce or dispense with the need for fuser release agents (such as fuser oils) in electrostatographic apparatuses.

In an electrostatographic printing apparatus, a light image of an original to be copied is recorded in the form of an electrostatic latent image upon a photosensitive member and the latent image is subsequently rendered visible by the application of electroscopic thermoplastic resin particles, which are commonly referred to as toner. The visible toner image is then in a loose powdered form and can be easily disturbed or destroyed. The toner image is usually fixed or fused upon a support which can be a photosensitive member itself or other support such as plain paper.

The use of thermal energy for fixing toner images onto a support member is known in the art. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of a support (such as a page of paper). Thereafter, as the toner material cools, solidification of the toner material causes the toner material to be firmly bonded to the support.

Thermoplastic resin particles can be fused to a support by heating to a temperature of between about 90° C. and about 160° C. or higher depending upon the softening range of the particular resin used in a toner. It is not desirable, however, to raise the temperature of the support substantially higher than about 200° C., because of the tendency of certain substrates to discolor at such elevated temperatures, particularly when the support is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat can be applied by heating one or both of the rolls, plate members or belt members. The fusing of the toner particles takes place when the proper combination of heat, pressure and contact time is provided. The balancing of these parameters to bring about the fusing of the toner particles is well known in the art, and the parameters can be adjusted to suit particular machines or process conditions.

Fuser roll topcoat materials are often made from low surface energy fluoropolymers such as perfluoroalkoxy, or other TEFLON®-like fluoropolymers, or fluoroelastomers such as those having the trademark VITON® from DuPont, which are expected to provide heat- and wear-resistance, conformability, and improved release at the fusing nip. VITON® GF, a fluoroelastomer, shows good mechanical properties but poor toner release. A current issue with existing fuser materials (such as VITON® materials) is the requirement for a release agent, e.g., PDMS (polydimethylsiloxane)-based fuser oil, for release of toner and other contaminants. The use of fuser oil increases the cost of the fuser release system and causes end-use problems because the silicone oil often remains on the prints. The fuser oil can result in difficulties in end uses of printed materials such as binding, lamination, or other processes requiring surface adhesion. New topcoat materials are required for low-oil or oil-less (machines that do not require a release agent or fuser oil), long-lifetime, high performance fusing applications.

During operation of a fusing system in which heat is applied to cause thermal fusing of the toner particles onto a support, both the toner image and the support are passed through a nip formed between the roll pair or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member can subsequently be transferred to other parts of the machine or onto the support in subsequent copying cycles, thus increasing the background or interfering with the material being copied. A "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of a fuser roll, and accordingly it is desired to provide a fusing surface, which has a low surfaced energy to provide the necessary release. To ensure and maintain good release properties of the fuser roll, release agents can be applied to the fuser roll during the fusing operation. These materials are often applied as thin films of, for example, silicone oils to prevent toner offset.

While highly successful in providing a fusing surface with a very low surface energy to provide excellent release properties to ensure that the toner is completely released from the fuser roll during the fusing operation, these release agent systems suffer from a significant deterioration in physical properties over time in a fusing environment. In particular, the silicone oil release agents tend to penetrate the surface of silicone elastomer fuser members resulting in swelling of the body of the elastomer causing major mechanical failure including debonding of the elastomer from the substrate, softening and reduced toughness of the elastomer causing it to crumble, contaminating the machine and providing non-uniform delivery of release agent.

The disclosure contained herein describes embodiments to address one or more of the problems described above.

SUMMARY

Certain embodiments are drawn to fuser members comprising a substrate, and thereover an outer layer polymer matrix having a surface. The outer layer polymer matrix comprises a fluoropolymer and fluorocarbon chains. The fluorocarbon chains are bonded to the fluoropolymer and have a formula (I)

(I)

wherein x is about 1 to about 3, R is a reactive group, C is a quaternary, tertiary, or secondary carbon atom, each L is independently a linking group, and each $R_f$ is independently a fully fluorinated fluorocarbon chain having from about 1 to about 40 carbon atoms or a semifluorinated fluorocarbon chain containing one or more of an ether, an ester or a silyl ether and having from about 1 to about 40 carbon atoms. Some embodiments are drawn to image forming apparatuses for forming images on a recording medium having such a fuser member.

Some embodiments are drawn to fuser members comprising a substrate, and thereover an outer layer polymer matrix having a surface. The outer layer polymer matrix comprises at least one fluoropolymer comprising up to about 40% of a repeating unit having formula (II) of the total number of repeating units, wherein formula (II) is (II)

x is about 1 to about 3, $R_1$ is a reactive group, each L is independently a linking group, and each $R_f$ is independently a fully fluorinated fluorocarbon chain having about 1 to about 40 carbon atoms or a semifluorinated fluorocarbon chain containing one or more of an ether, an ester or a silyl ether and having about 1 to about 40 carbon atoms. Some embodiments are drawn to image forming apparatuses for forming images on a recording medium having such a fuser member. The fluoropolymer can comprise from about 0.5% to about 40%, from about 2% to about 30%, or from about 5% to about 15% of a repeating unit of formula (II). The outer layer can comprise from about 80 weight percent to about 100 weight percent fluoropolymer, from about 85 weight percent to about 99.5 weight percent fluoropolymer, or from about 90 weight percent to about 99 weight percent fluoropolymer. The outer layer can also contain fillers in about 0 weight percent to about 20 weight percent, from about 0.5 weight percent to about 15 weight percent, or from about 1 weight percent to about 10 weight percent.

Some embodiments are drawn to methods of making a fuser member comprising providing a fuser member comprising a substrate and thereover, an outer layer polymer matrix having a surface. The polymer matrix comprises a fluoropolymer comprising vinylidene fluoride repeating units and the fuser member is contacted with a phase transfer catalyst and an aqueous base to produce unsaturated —CH=CF— linkages in the polymer. The unsaturated linkages are produced in the fluoropolymer at least at the surface of the outer layer polymer matrix. The fuser member with the unsaturated linkages is contacted with an amine comprising at least one perfluoroalkyl group thereby binding amine groups containing the at least one perfluoroalkyl group to the vinylidene fluoride repeating units. Each perfluoroalkyl group independently comprises from about 5 to about 50 carbon atoms.

DETAILED DESCRIPTION

In embodiments, vinylidene fluoride containing polymers (such as VITON® GF) can be chemically modified to introduce reactive functionalities on their surface. Surface substitution can then be accomplished via the addition of a perfluoroalkylated nucleophile to the reactive species. The surface free energy of the treated polymer can be reduced significantly after introduction of the perfluoroalkylated groups and can result in improved toner release when the polymers are used in fuser members.

Branched polyperfluoroalkylated derivatives of fluoropolymers (for example fluoroelastomers, among others) described herein can have better release properties (and increased surface free energy) than certain fluoroelastomer/fluoropolymer derivatives having pendant or crosslinked linear perfluoroalkylamines, as branching can considerably increase the surface fluorine density and can prevent perfluoroalkyl chains from orienting parallel to the surface of the fuser member. Furthermore, as the cross-linking density may not be increased using methods of embodiments, the mechanical properties of the fluoropolymeric systems can be preserved despite their derivatization.

In some electrostatographic processes, two major types of fuser topcoat materials, e.g., fluoroelastomers and fluoroplastics, are used for fuser member surfaces. Fluoroelastomers (e.g., VITON® GF, a tetrapolymer of tetrafluoroethylene (TFE), hexafluoropropylene (HFP), vinylidene fluoride (VF2), and a cure site monomer) can provide good mechanical flexibility with an ability to absorb shock energy and can also provide high speed with high print quality. However, fluoroelastomer and fluoroplastic fusers can require a release agent to prevent an offset caused by the low fluorine content nature of such fluoropolymers. Such use of a release agent, e.g., silicone oil, can increase the cost of the fuser release system and can cause end-use problems, because silicone oil often remains on the prints.

The release properties of VF2 containing fluoropolymers (such as fluoroelastomers, among others) can be improved in embodiments by improving the surface free energy (SFE) of the material. Modifying the SFE of VF2 containing fluoropolymer using conventional methods can result in disruption of the desirable mechanical properties of the fluoropolymers, as chemical modification of the VF2 units can lead to additional cross-linking which can make the fluoropolymer/fluoroelastomer brittle.

Embodiments herein are drawn to fuser members comprising an outer layer polymer matrix containing a fluoropolymer and fluorocarbon chains, some or all of the fluorocarbon chains are chemically bonded to the fluoropolymer. The fuser members can be self-releasing or partially self-releasing. The fluorocarbon chains can have a formula (I)

(I)

wherein x is about 1 to about 3, R is a reactive group, C is a quaternary, tertiary, or secondary carbon atom, each L is independently a linking group, and each $R_f$ is independently a fully fluorinated fluorocarbon chain having from about 1 to about 40 carbon atoms, from about 1 to about 35 carbon atoms, from about 1 to about 25 carbon, or from about 3 to about 20 atoms, or a semifluorinated fluorocarbon chain containing one or more of an ether, an ester or a silyl ether and having from about 1 to about 40 carbon atoms, from about 1 to about 35 carbon atoms, from about 1 to about 25 carbon atoms, or from about 3 to about 20 atoms. Thus, fluorocarbon chains in the outer layer polymer matrix are bonded to the fluoropolymer by reactive functionalities. In embodiments, x is 2 or x is 3. R is a primary amine in some embodiments. In certain embodiments, C is a secondary carbon atom. The linking group can comprise an aromatic ring or an aryl alkene in some embodiments. The linking group can be an ether, ester, silyl ether, or a hydrocarbon. In embodiments, each $R_f$ is independently a fully fluorinated fluorocarbon chain having from about 1 to about 40 carbon atoms, from about 1 to about 35 carbon atoms, from about 1 to about 25 carbon atoms, or from about 3 to about 20 atoms. In embodiments, each $R_f$ is independently a semifluorinated fluorocarbon chain containing one or more of an ether, an ester or a silyl ether having from about 1 to about 40 carbon atoms, from about 1 to about 35 carbon atoms, from about 1 to about 25 carbon atoms, or from about 3 to about 20 atoms.

In embodiments, the composition can impart a high degree of fluorination at the fusing surface thereby facilitating release with a minimal amount of fuser oil, or without the use of fuser oil. This can reduce or eliminate the transfer of fuser oil onto the printed supports (e.g., sheet paper, among others). Fuser oil transferred to printed support can result in undesirable issues involving subsequent applications requiring adhesion to the surface, such as lamination or book binding. The manufacturing costs of a machine including a fuser member described herein can also be reduced in the instance of an oil-less machine as the fuser oil sump and components are not necessary.

Figure 1:
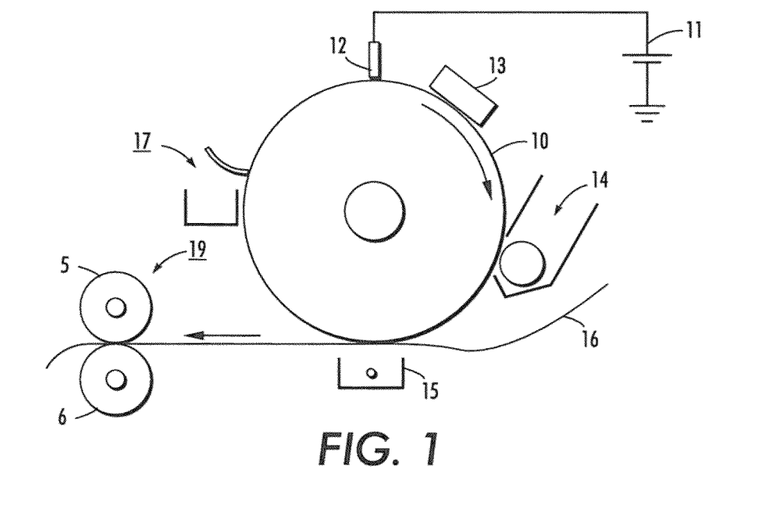
FIG. 1 is an illustration of a general electrostatographic apparatus.

Referring to FIG. 1, in an electrostatographic reproducing apparatus, a light image of an original to be copied can be recorded in the form of an electrostatic latent image upon a photosensitive member and the latent image can subsequently be rendered visible by the application of electroscopic thermoplastic resin particles which are commonly referred to as toner. Specifically, photoreceptor 10 can be charged on its surface by means of a charger 12 to which a voltage has been supplied from power supply 11. The photoreceptor can then be imagewise exposed to light from an optical system or an image input apparatus 13, such as a laser and light emitting diode, to form an electrostatic latent image thereon.

Generally, the electrostatic latent image can be developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material can be advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image can be completed, copy sheet 16 advances to fusing station 19, depicted in FIG. 1 as fusing and pressure rolls, wherein the developed image can be fused to copy sheet 16 by passing copy sheet 16 between the fuser member 5 and pressure member 6, thereby forming a permanent image. Photoreceptor 10, subsequent to transfer, advances to cleaning station 17, wherein any toner left on photoreceptor 10 can be cleaned therefrom by use of a blade (as shown in FIG. 1), brush, or other cleaning apparatus.

Figure 2:
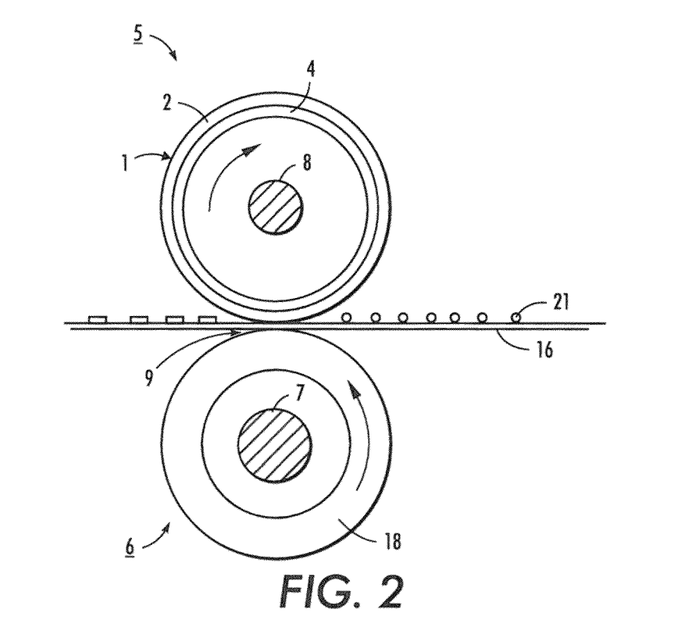
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which can be coextensive with the cylinder.

Backup or pressure roll 6 cooperates with fuser roll 5 to form a nip or contact arc 9 through which a copy paper or other support 16 passes such that toner images 21 thereon contact surface 2 of fuser roll 5. As shown in FIG. 2, the backup roll 6 has a rigid steel core 7 with a surface or layer 18 thereon.

The fuser member can be comprised of at least three different configurations. In one embodiment, the fuser member can be of a two-layer configuration 1 as shown in FIG. 2. Fuser member 5 having heating element 8, comprises substrate 4. Positioned over the substrate 4 can be outer layer 2.

Figure 3:
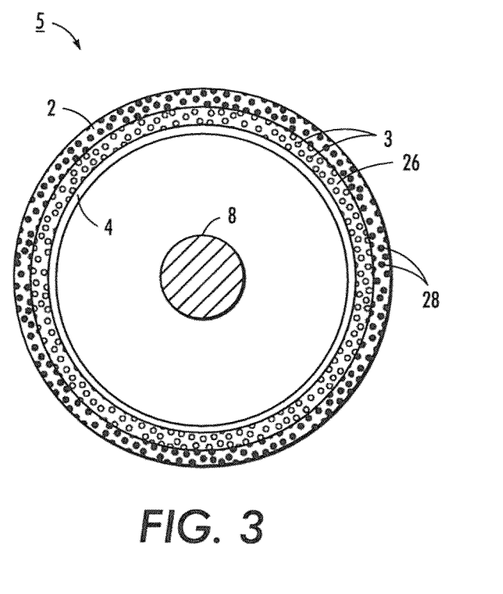
FIG. 3 is a sectional view of a fuser roller having a three-layer configuration.

FIG. 3 demonstrates a three-layer configuration, wherein fuser roller 5 has heating member 8 inside, and thereover substrate 4 and having intermediate layer 26 positioned on substrate 4, and outer layer 2 positioned on intermediate layer 26. FIG. 3 demonstrates optional fillers 3 and 28, which can be the same or different, and can be dispersed optionally in the intermediate layer 26, and/or optionally in the outer layer 2. There may be provided none, one, or more than one type of filler(s) in the layer(s).

The intermediate layer 4 having thereon topcoat or outer polymer matrix 2 having dispersed and linked chemically to the fluoropolymer therein, fluorocarbon chains. The outer layer includes the fluorocarbon chains oriented nonparallel to the surface of the fuser member, in embodiments.

In embodiments, the fuser member can be self-releasing or partially self-releasing, requiring little or no release agent. If no release agent is required then no release agent sump and release agent donor member need be used in an image forming apparatus containing such a fuser member. Fluorocarbon chains are chemically bonded to a fluoropolymer, and orient out and away from the fluoropolymer backbone, so that the exterior of the fuser layer can be composed primarily of fluorinated carbon chains. The fluorinated carbon chains impart a high degree of fluorination at the fusing surface and can facilitate release without the need for fuser oil or release agent. The topcoat/outer layer, as such, is "self-releasing" if the surface facilitates the release of toner, toner additives, and other contaminants in contact with the fusing surface of a fuser member, without the use of fuser release agent (release oil). Fuser release agents can comprise polydimethylsiloxane, or polydimethylsiloxane derivatives/oils. Embodiments also include a fuser member that is partially self-releasing and requires the use of a minimal amount of release agent to meet required performance specifications at the fusing surface.

Certain embodiments are drawn to fuser members comprising: a substrate, and thereover an outer layer polymer matrix having a surface. The fuser member can be self-releasing or partially self-releasing. The outer layer polymer matrix can comprise a fluoropolymer and fluorocarbon chains, wherein the fluorocarbon chains are bonded to the fluoropolymer and have a formula (I)

$$R-C(-L-R_f)_x \qquad (I)$$

wherein x is about 1 to about 3, R is a reactive group, C is a quaternary, tertiary, or secondary carbon atom, each L is independently a linking group, and each $R_f$ is independently a fully fluorinated fluorocarbon chain having from about 1 to about 40 carbon atoms, from about 1 to about 35 carbon atoms, from about 1 to about 25 carbon atoms, or from about 3 to about 20 atoms, or a semifluorinated fluorocarbon chain containing one or more of an ether, an ester or a silyl ether and having from about 1 to about 40 carbon atoms, from about 1 to about 35 atoms, from about 1 to about 25 carbon atoms, or from about 3 to about 20 atoms. In embodiments, x is 2 or x is 3. R can be a primary amine in some embodiments. C can be a secondary atom in embodiments. The linking group can comprise an aromatic ring or an aryl alkene in certain embodiments. The linking group can be an ether, ester, silyl ether, or a hydrocarbon. In embodiments, each $R_f$ is independently a fully fluorinated fluorocarbon chain having from about 1 to about 40 carbon atoms, from about 1 to about 35 carbon atoms, from about 1 to about 25 carbon atoms, or from about 3 to about 20 atoms. In embodiments, each $R_f$ is independently a semifluorinated fluorocarbon chain containing one or more of an ether, an ester or a silyl ether having from about 1 to about 40 carbon atoms, from about 1 to about 35 carbon atoms, from about 1 to about 25 carbon atoms, or from about 3 to about 20 atoms.

In embodiments, the fluorocarbon chains can orient out and away from the backbone of the fluoropolymer and the fluorocarbon chains can be oriented nonparallel to the surface of the fuser member. The fluorinated groups ($R_f$) in the outer release layer of a fuser member can be fully fluorinated or semi-fluorinated. Fully fluorinated chains are entirely fluorinated carbon chains. The fluorinated carbon chains can bond to the polymeric backbone of the fluoropolymer (such as a fluoroelastomer) via intermediate groups (i.e., linking and reactive groups).

R (in formula (I)) can comprise

R can further comprise an aliphatic chain comprising from about 1 to about 40 carbon atoms, from about 1 to about 35 carbon atoms, or from about 1 to about 20 carbon atoms in some embodiments.

The linking group (L) (as in formulas (I) and (II)) can comprise a saturated or unsaturated hydrocarbon chain having about 1 to about 40 carbon atoms, about 1 to about 35 carbon atoms, about 1 to about 25 carbon atoms, or from about 3 to about 20 atoms and contains one or more of an ether group, an ester group, an amide group, an imine group, a silyl ether group, an acid anhydride group, an aromatic ring and a heteroaromatic ring. In embodiments, the linking group comprises an aromatic ring or an aryl alkene. The linking group can be an ether, ester, silyl ether, or a hydrocarbon. In some embodiments, the linking group comprises at least one unsaturated carbon-carbon bond.

Each $R_f$ (as in formulas (I) and (II)) can be a fully fluorinated aliphatic fluorocarbon chain having the formula $(CF_2)_n$ $CF_3$ and n is 0 to about 20, about 4 to about 19, or about 4 to about 10 in some embodiments. In embodiments $R_f$ can comprise at least one unsaturated carbon-carbon bond. $R_f$ or C-(L-$R_f)_x$ can be branched in some embodiments. $R_f$ can be $(CF_2)_5$ $CF_3$, $(CF_2)_6CF_3$, or $(CF_2)_7CF_3$ in embodiments.

In embodiments, the fluoropolymer to which the fluorocarbon chains are bonded can comprise a fluoroelastomer comprising a copolymer of vinylindenefluoride and hexafluoropropylene or tetrafluoroethylene; a terpolymer of vinylindenefluoride, hexafluoropropylene and tetrafluoroethylene; or a tetrapolymer of vinylindenefluoride, hexafluoropropylene tetrafluoroethylene and a cure site monomer. In certain embodiments, the fluoropolymer can comprise a fluoroelastomer comprising a tetrapolymer of vinylindenefluoride, hexafluoropropylene tetrafluoroethylene and a cure site monomer. In some embodiments, the fluoropolymer can be VITON® GF.

In some embodiments, the outer layer polymer matrix can further comprise at least one of perfluoroalkoxy, polytetrafluoroethylene, and fluorinated ethylene propylene resin. Examples of other fluoropolymers include fluoroplastics or fluoropolymers such as polytetrafluoroethylene, fluorinated ethylene propylene resin, perfluoroalkoxy (PFA), and other TEFLON®-like materials, and polymers thereof. The outer layer can comprise from about 0.1 weight % to about 60 weight %, from about 1 weight % to about 50 weight %, or from about 5 weight % to about 30 weight % fluoropolymers in addition to the fluoropolymer to which the fluorocarbon chains are bonded.

Some embodiments are drawn to image forming apparatuses for forming images on a recording medium comprising: a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a fuser member comprising fluorocarbon chains bonded to a fluoropolymer having formula (I), ad discussed above. The fuser member can be self-releasing or partially self-releasing and the image forming apparatuses can be oil-less or nearly so in embodiments.

Certain embodiments are drawn to fuser members comprising: a substrate, and thereover an outer layer polymer matrix having a surface. The fuser members can be self-releasing or partially self-releasing in embodiments. The outer layer polymer matrix can comprise at least one fluoropolymer comprising up to about 40% of a repeating unit having formula (II) of the total number of repeating units, wherein formula (II) is x is about 1 to about 3, $R_1$ is a reactive group, each L is independently a linking group, and each $R_f$ is independently a fully fluorinated fluorocarbon chain having about 1 to about 40 carbon atoms or a semifluorinated fluorocarbon chain containing one or more of an ether, an ester or a silyl ether and having about 1 to about 40 carbon atoms. In embodiments, x is 2 or x is 3. The reactive group $R_1$ is independently a secondary amine in some embodiments. The L linking group can comprise an aromatic group or an aryl alkene, in certain embodiments. In some embodiments the linking group can comprise an unsaturated carbon-carbon bond. In some embodiments the linking group can comprise an ether, ester, silyl ether, or a hydrocarbon. In embodiments, each $R_f$ is independently a fully fluorinated fluorocarbon chain having from about 1 to about 40 carbon atoms, from about 1 to about 35 carbon atoms, from about 1 to about 25 carbon atoms, or from about 3 to about 20 atoms. In embodiments, each $R_f$ is independently a semifluorinated fluorocarbon chain having from about 1 to about 40 carbon atoms, from about 1 to about 35 carbon atoms, from about 1 to about 25 carbon atoms, or from about 3 to about 20 atoms. The fluoropolymer can comprise from about 0.5% to about 40%, from about 2% to about 30%, or from about 5% to about 15% of a repeating unit of formula (II). The outer layer can comprise from about 80 weight percent to about 100 weight percent fluoropolymer, from about 85 weight percent to about 99.5 weight percent fluoropolymer, or from about 90 weight percent to about 99 weight percent fluoropolymer. The outer layer can also contain fillers in about 0 weight percent to about 20 weight percent, from about 0.5 weight percent to about 15 weight percent, or from about 1 weight percent to about 10 weight percent.

In embodiments, the fluoropolymer can comprise from about 0.5% to about 40%, from about 2% to about 30%, or from about 5% to about 15% of a repeating unit having the formula (V)

(V)

wherein n can be about 2 to about 20, or about 5 to about 10.

In embodiments, the fluoropolymer can comprise from about 0.5% to about 40%, from about 2% to about 30%, or from about 5% to about 15% of a repeating unit having the formula (IX)

(IX)

In embodiments, the fluoropolymer can comprise from about 0.5% to about 40%, from about 2% to about 30%, or from about 5% to about 15% of a repeating unit having the formula (VI)

(VI)

wherein each n is independently about 1 to about 20, about 5 to about 20, or about 5 to about 10.

In embodiments, the fluoropolymer can comprise from about 0.5% to about 40%, from about 2% to about 30%, or from about 5% to about 15% of a repeating unit having the formula (X)

(X)

In embodiments, the fluoropolymer can further comprise a repeating unit having the formula (III) from about 5 weight percent to about 80 weight percent, from about 10 weight percent to about 65 weight percent, or from about 15 weight percent to about 40 weight percent.

(III)

and/or
a repeating unit having the formula (IV) from about 5 weight percent to about 80 weight percent, from about 10 weight percent to about 65 weight percent, or from about 15 weight percent to about 40 weight percent.

(IV)

In embodiments, the fluoropolymer can comprise a fluoroelastomer backbone, the fluoroelastomer backbone comprising a copolymer of vinylindenefluoride and hexafluoropropylene or tetrafluoroethylene; a terpolymer of vinylindenefluoride, hexafluoropropylene and tetrafluoroethylene; or a tetrapolymer of vinylindenefluoride, hexafluoropropylene tetrafluoroethylene and a cure site monomer. In embodiments, the fluoropolymer can comprise a fluoroelastomer backbone comprising VITON® GF. For example, VITON GF® and VITON GH® have about 35 weight percent of vinylidenefluoride repeating units, about 34 weight percent of hexafluoropropylene repeating units, and about 29 weight percent of tetrafluoroethylene repeating units, with about 2 weight percent cure site monomer repeating units.

As discussed above, $R_1$ (as in formula (II)) can comprise a secondary amine group, a hydroxyphenyl group or a sulfonyl azide group. In embodiments, $R_1$ can comprise a secondary amine. The linking group (L) can comprise a saturated or unsaturated hydrocarbon chain having about 1 to about 30 carbon atoms and contains one or more of an ether group, an ester group, an amide group, an imine group, a silyl ether group, an acid anhydride group, an aromatic ring and a heteroaromatic ring. The L linking group can comprise an aromatic group or an aryl alkene, in certain embodiments. In some embodiments the linking group can comprise an unsaturated carbon-carbon bond. The linking group can be an ether, ester, silyl ether, or a hydrocarbon in embodiments.

Certain embodiments are drawn to image forming apparatuses for forming images on a recording medium comprising: an imaging member; a charging unit that applies electrostatic charge on the imaging member; a developing unit that develops a toner image onto the imaging member; a transfer unit that transfers the toner image from the imaging member to a medium; and a fuser member comprising an outer layer polymer matrix comprising at least one fluoropolymer comprising up to about 40% of a repeating unit having formula (II) of the total number of repeating units, wherein formula (II) is as discussed above. The fluoropolymer can comprise from about 0.5% to about 40%, from about 2% to about 30%, or from about 5% to about 15% of a repeating unit of formula (II). The outer layer can comprise from about 80 weight percent to about 100 weight percent fluoropolymer, from about 85 weight percent to about 99.5 weight percent fluoropolymer, or from about 90 weight percent to about 99 weight percent fluoropolymer. The outer layer can also contain fillers in about 0 weight percent to about 20 weight percent, from about 0.5 weight percent to about 15 weight percent, or from about 1 weight percent to about 10 weight percent.

Examples of suitable fluoropolymers include fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257, 699, 5,017,432 and 5,061,965, the disclosures each of which are incorporated by reference herein in their entirety. As described therein, these elastomers are from the class of 1) copolymers of vinylidenefluoride and hexafluoropropylene (known commercially as VITON® A), or two of vinylidenefluoride, hexafluoropropylene and tetrafluoroethylene; 2) terpolymers of vinylidenefluoride, hexafluoropropylene and tetrafluoroethylene (known commercially as VITON® B); and 3) tetrapolymers of vinylidenefluoride, hexafluoropropylene, tetrafluoroethylene and cure site monomer (known commercially as VITON® GH and VITON® GF). Examples of commercially available fluoroelastomers include those sold under various designations such as VITON® A, VITON® B, VITON® E, VITON® E60C, VITON® E430, VITON® 910, VITON® GH; VITON® GF; and VITON® ETP. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer. These listed are commercially available from DuPont. The fluoroelastomers VITON® GH and VITON® GF have relatively low amounts of vinylidenefluoride. The VITON® GF and VITON® GH have about 35 weight percent of vinylidenefluoride, about 34 weight percent of hexafluoropropylene, and about 29 weight percent of tetrafluoroethylene with about 2 weight percent cure site monomer. The fluorocarbon chains can be bonded to such fluoropolymers in embodiments.

Other commercially available fluoroelastomers include fluoroelastomers from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1, 1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 21740, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont. In embodiments, the fluorocarbon chains can be bonded to such fluoropolymers.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. In embodiments, the fluorocarbon chains can be bonded to such fluoropolymers.

The amount of fluoroelastomer in a solution used to prepare the outer layer of a fuser member, in weight percent of total solids, can be from about 10 to about 40 percent, or from about 15 to about 35 percent by weight of total solids. Total solids as used herein include the amount of polymer, dehydrofluorinating agent (if present) and optional adjuvants, additives, and fillers. The amount of fluorocarbon chains in solution to form the outer layer can be from about 1 pph to about 100 pph (parts per hundred compared to weight of fluoropolymer/fluoroelastomer (present in solution), or from about 5 pph to about 40 pph.

The thickness of the outer surface layer of the fuser member herein, can be from about 10 to about 100 micrometers, or from about 15 to about 40 micrometers.

Optional intermediate adhesive layers and/or intermediate polymer or elastomer layers can be applied to achieve desired properties and performance objectives of a fuser member. The intermediate layer(s) can be present between the substrate and the outer polymeric layers. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer can be bonded to the substrate via an adhesive layer. The thickness of an intermediate layer can be from about 0.5 mm to about 20 mm, or from about 1 mm to about 5 mm.

The fluoropolymer and other components (such as, optional, fluoroplastics, fillers, etc.) of the outer layer can be coated on the substrate in any suitable known manner. Examples of techniques for coating such materials on the reinforcing member (substrate) include liquid and dry powder spray coating, dip coating, wire wound rod coating, fluidized bed coating, powder coating, electrostatic spraying, sonic spraying, blade coating, and the like. In an embodiment, the coating can be spray or flow coated to the substrate. Details of the flow coating procedure can be found in U.S. Pat. No. 5,945,223, the disclosure of which is hereby incorporated by reference in its entirety. The fluorocarbon chains can be added and reacted with the fluoropolymer after it is coated on the substrate. In some embodiments, the coated substrate can be dried and/or cured before being reacted with the hydrocarbon chains.

In an embodiment, the outer layer (before or after bonding with the hydrocarbon chains) may be modified by any known technique such as sanding, polishing, grinding, blasting, coating, or the like. In embodiments, the outer fluoropolymer matrix layer (before or after reaction with the hydrocarbon chains) has a surface roughness of from about 0.02 micrometers to about 1.5 micrometers, or from about 0.3 micrometers to about 0.8 micrometers.

Other fillers can be present in the outer layer and/or included in an intermediate layer. Fillers include metals and metal alloys, metal oxides, polymer fillers, carbon fillers, and the like, and mixtures thereof. Examples of metal oxides include copper oxide, alumina, silica, magnesium oxide, zinc oxide, tin oxide, indium oxide, indium tin oxide, and the like, and mixtures thereof. Examples of polymer fillers include polyanilines, polyacetylenes, polyphenelenes polypyrroles, polytetrafluoroethylene, and the like, and mixtures thereof. Examples of suitable carbon fillers include carbon black, carbon nanotubes, fluorinated carbon black, graphite and the like, and mixtures thereof.

Examples of suitable substrate materials for the fuser member include, in the case of roller substrate, metals such as aluminum, stainless steel, steel, nickel and the like. In the case of film-type substrates (in the event the substrate can be a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

Certain embodiments are drawn to methods of fuser members comprising: providing a fuser member comprising a substrate and thereover, an outer layer polymer matrix having a surface, wherein the polymer matrix comprises a fluoropolymer comprising vinylidenefluoride repeating units. The outer layer polymer can be applied to the substrate by methods know in the art, as discussed above. The outer layer of the fuser member comprising the fluoropolymer can include other components known in the art, such as polymer fillers or carbon fillers, among others discussed above The fuser member can be contacted with a phase transfer catalyst and an aqueous base to produce unsaturated —CH═CF— linkages in the polymer, wherein the unsaturated linkages are produced in the fluoropolymer at least at the surface of the outer layer polymer matrix; and the fuser member is then contacted with an amine comprising at least one perfluoroalkyl group thereby binding amine groups containing the at least one perfluoroalkyl group to the vinylidene fluoride repeating units, wherein each perfluoroalkyl group independently comprises about 5 to about 50 carbon atoms, about 5 to about 20 carbon atoms, or about 5 to about 10 carbon atoms. The amine can be a tertiary amine in embodiments. The amine can further comprise a linking group that links the amine group to the at least one perfluoroalkyl group. The linking group can comprise an aromatic group or an aryl alkene in some embodiments. In certain embodiments the linking group comprises at least one unsaturated carbon-carbon bond. The linking group can be an ether, ester, silyl ether, or a hydrocarbon in embodiments. Exemplary amines include 1H,1H-perfluorohexylamine, 1H,1H-perfluoroheptylamine, 1H,1H-perfluoroocytylamine, and 1H,1H-perfluorononylamine, among others.

As discussed above, the fluoropolymers used in some methods can comprise a fluoroelastomer backbone, the fluoroelastomer backbone comprising a copolymer of vinylindenefluoride and hexafluoropropylene or tetrafluoroethylene; a terpolymer of vinylindenefluoride, hexafluoropropylene and tetrafluoroethylene; or a tetrapolymer of vinylindenefluoride, hexafluoropropylene tetrafluoroethylene and a cure site monomer.

In embodiments, the phase transfer catalyst can be tetrabutylammonium bromide (nBU$_4$NBr) and the aqueous base can be an aqueous solution of sodium hydroxide (NaOH).

The amine can have the formula (VII)

(VII)

wherein n is about 4 to about 19, in certain embodiments.

In embodiments, the amine can have the formula (VIII)

(VIII)

wherein each n is independently about 4 to about 19.

In some embodiments the amine can have the formula (XI)

(XI)

In embodiments, the surface of VF2 containing polymers can be modified using a phase transfer catalyst (such as tetrabutylammonium bromide (nBu$_4$Br)) and aqueous base (such as aqueous NaOH) to introduce unsaturated —CH=CF— linkages through dehydrofluorination of the vinylidenedifluoride units (which make up about 30% of VITON® GF). The depth of the eliminated surface can be controlled by elimination conditions employed, for example, an organic base (such as triethylamine or 1,8-diazabicyclo[5.4.0]undec-7-ene) can penetrate the surface further than aqueous hydroxide ions resulting in formation of a deeper reactive layer. In embodiments, grafting of low surface energy fluorinated chemical groups onto reactive sites created on the fluoropolymer (such as fluoroelastomer) can decrease the SFE of VITON® without degrading the bulk of the material thereby maintaining the mechanical properties.

In embodiments, surface substitution of a fluoroaminated VF2 containing polymer/elastomer (such as VITON®) can be accomplished using a phase transfer catalyst (for example, tetrabutylammonium hydroxide or a hydroxide salt in combination with a tetrabutylammonium halide or a hydroxide or carbonate salt in combination with a crown ether such as 18-crown-6 during an elimination reaction, followed by an optional intermediate drying step, and finally a Michael-type addition of a perfluoroalkylated amine). The SFE of the treated fluoropolymer can be reduced significantly upon surface functionalization with the perfluoroalkylated amine and this can improve toner release. The use of a highly fluorinated branched amine in can reduce the SFE due to an increase in fluorine density at the surface of a fuser member containing such a fluoropolymer in its outer layer.

The outer layer polymer matrix can comprise a fluoropolymer and fluorocarbon chains, wherein the fluorocarbon chains are bonded to the fluoropolymer and have a formula (I) R—C—(L-R$_f$)$_x$ (I). Functionalization of the outer layer with a fluorocarbon chain can reduce the surface free energy of the fluoropolymer layer by about 5% to about 50% or by about 10% to about 30% resulting in an improvement in toner release. For example, in one embodiment functionalization (with carbon chains) of the outer layer (Viton-GF®) can result in an about 18% reduction in surface free energy (SFE), from about 26.5 mN/m to about 21.7 mN/m.

The following Examples further define and describe embodiments herein. Unless otherwise indicated, all parts and percentages are by weight.

EXAMPLES

Example 1

Surface Perfluorinated Vinylidene Fluoride Polymer

Preparation of —CH=CF— Eliminated Surface

Figure 4:
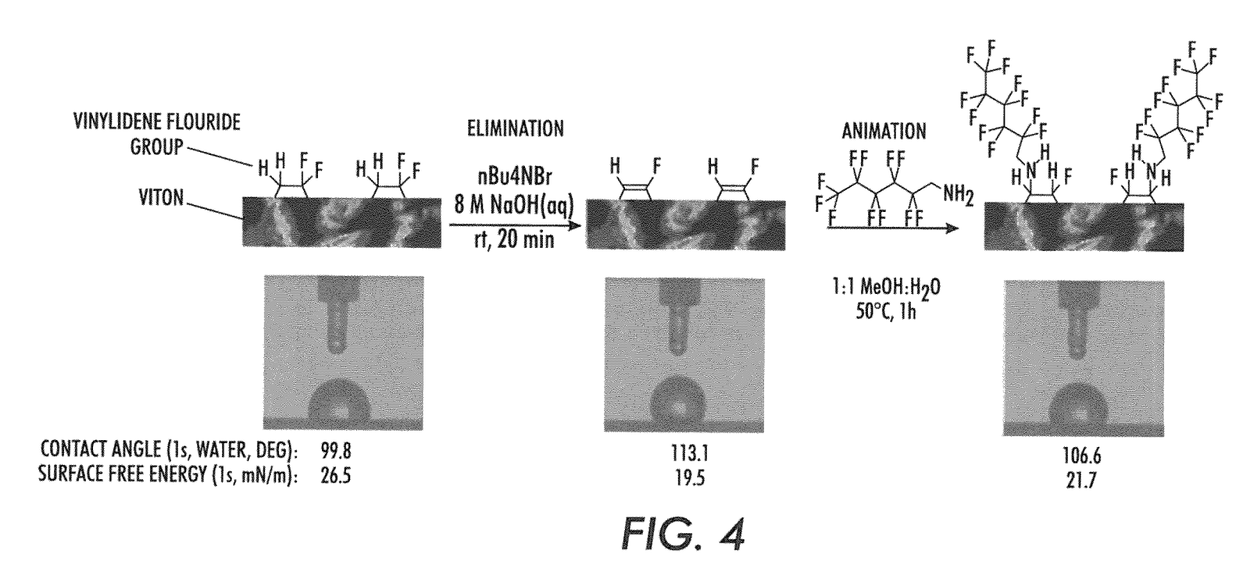
FIG. 4 depicts measurements of contact angle for VITON® film as it undergoes HF elimination and perfluoroalkyl amination.

A freestanding 5 cm$^2$ strip of VITON® GF (AO700 cured) was submersed in an 8 M NaOH(aq) solution containing a catalytic amount of tetrabutylammonium bromide (nBu$_4$NBr), rinsed, and dried at reduced pressure. Contact angle measurements were taken as shown in FIG. 4. The surface free energy (SFE) decreased from 26.5 mN/m to 19.5 mN/m (FIG. 4) confirming dehydrofluorination had occurred. It was previously demonstrated that treatment of vinylidene fluoride with an aqueous NaOH/catalytic nBu$_4$NBr solution only dehydrofluorinated the outermost layer (40-80 Å) as the aqueous solution cannot swell the polymer. For this reason it was hypothesized dehydrofluorination of the cured VITON® GF would only occur at the film-water interface. Supporting this, UV-Vis and IR spectroscopy confirmed the bulk of the material remained unperturbed as there was no discernible difference between the spectra before and after elimination.

Preparation of an Amine/VITON® Composite

Following dehydrofluorination the VITON® GF surface was treated with a 0.017 M solution of 1H,1H-perfluorohexylamine in 1:1 w/w MeOH/H$_2$O. The film was washed repeatedly and dried at reduced pressure. UV-Vis and IR spectroscopy revealed that the bulk of the material was unchanged, while SFE measurements confirmed the surface was functionalized (FIG. 4). FIG. 4. Top: Illustration of elimination/amination chemistry that occurred at the surface of the VITON® film in the example. Bottom: From left to right, drop of water on VITON® GF, VITON® GF after HF elimination, and VITON® GF after perfluoroalkyl amination.

The SFE increased slightly upon amination with 1H,1H-perfluorohexylamine, from 19.5 mN/m to 21.7 mN/m (FIG. 4). Nonetheless, surface treatment with a perfluoroamine resulted in an SFE nearly 5 mN/m less than the untreated VITON® GF starting material and nearly as good as perfluoroalkyloxy resin (PFA, SFE≈18 mN/m), which exhibits excellent toner release. Although the addition of a perfluoroalkyl chain was expected to decrease the SFE, a slight increase was observed. One possible explanation (not to be bound by theory) is that the presence of an exposed N—H bond (particularly if the alkyl chain is not oriented perpendicular to the surface) results in a competing hydrophilic effect. These two phenomena may nearly offset each other resulting in the small increase in SFE observed upon amination with a linear perfluoroamine.

Example 2

Synthesis of Perfluoroalkylated Tris(Hydroxymethyl)Aminomethane

Figure 5:
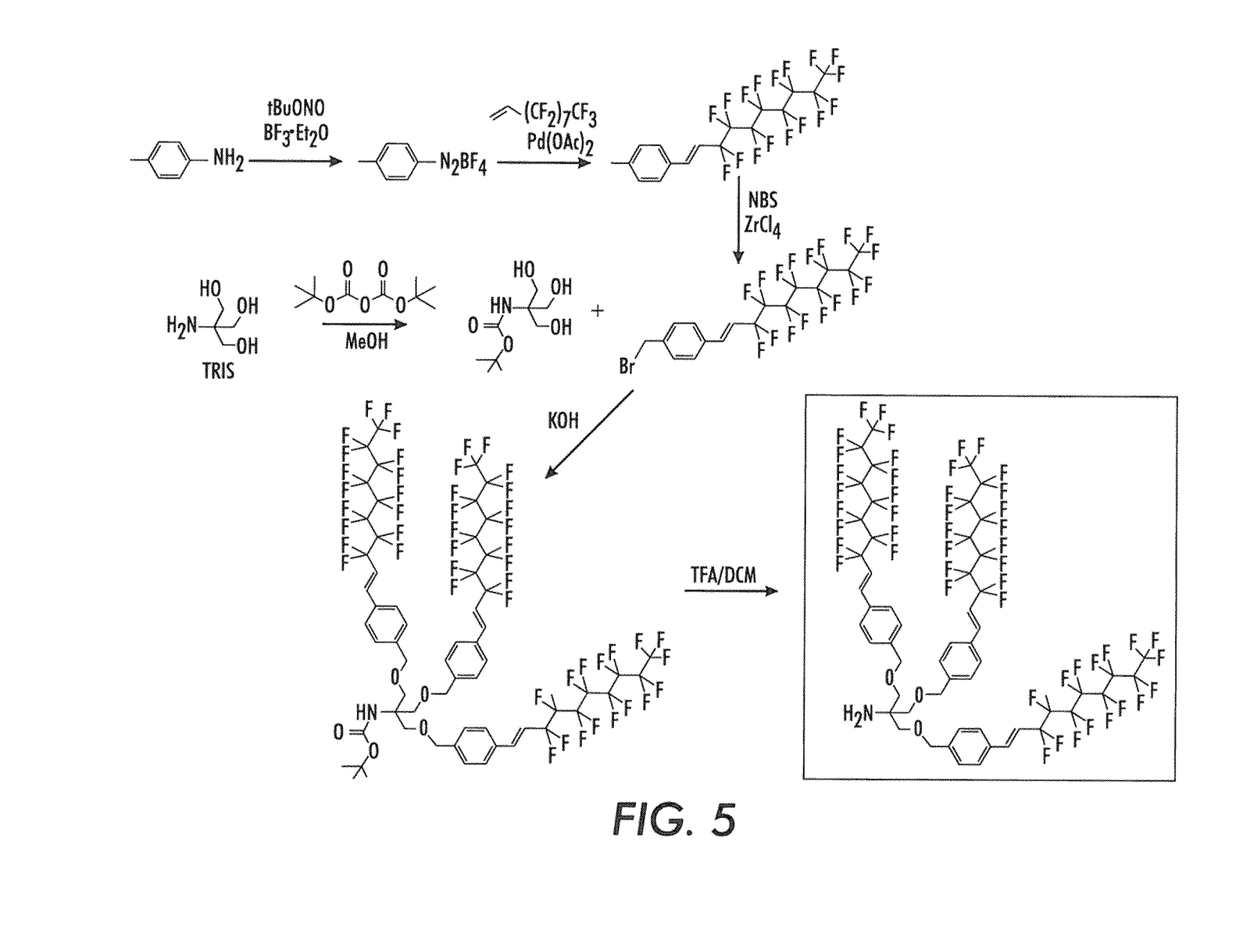
FIG. 5 illustrates a synthesis scheme for perfluoroalkylated tris(hydroxymethyl)aminomethane.

It is hypothesized that branched amines (or other nucleophiles) which have molecular geometries that would force the perfluoroalkyl chains to orient away from the surface could eliminate the presence of exposed hydrogen-bond donors and/or acceptors and further decrease the SFE. Polyfluoroalkylated amines based on the tri(hydroxymethyl)aminomethane (TRIS) core were synthesized as shown in FIG. 5.

In a gas phase geometry optimized structure of a perfluoroalkylated TRIS molecule (synthesized as in FIG. 5), the geometry of the amine core and the rigidity of the phenylvinyl linker results in a cone-shaped molecule in which the perfluoroalkyl chains orient out and away from the polymer backbone. It is predicted that the branched polyperfluoroalkylated derivative will improve on compositions containing linear (non-branched) perfluoroalkylamines, as branching is predicted to increase the surface fluorine density and prevent chains from orienting parallel to the surface.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

To the extent that the terms "containing," "including," "includes," "having," "has," "with," or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g., −1, −1.2, −1.89, −2, −2.5, −3, −10, −20, and −30, etc.

What is claimed is:

1. A self-releasing fuser member comprising:
a substrate, and thereover
an outer layer polymer matrix having a surface, wherein the outer layer polymer matrix comprises a fluoropolymer and fluorocarbon chains, wherein the fluorocarbon chains are bonded to the fluoropolymer and have a formula (I)

$$R\text{—}C\text{—}(L\text{-}R_f)_x \quad (I)$$

wherein x is 2 or x is 3, R is a reactive group, C is a quaternary, tertiary, or secondary carbon atom, each L is independently a linking group, and each $R_f$ is independently a fully fluorinated fluorocarbon chain having from about 1 to about 40 carbon atoms or a semifluorinated fluorocarbon chain containing one or more of an ether, an ester or a silyl ether and having from about 1 to about 40 carbon atoms, wherein R is not 2. The self-releasing fuser member of claim 1, wherein the fluorocarbon chains orient out and away from the backbone of the fluoropolymer and the fluorocarbon chains are oriented nonparallel to the surface.

3. The self-releasing fuser member of claim 1, wherein R comprises

4. The self-releasing fuser member of claim 3, wherein R further comprises an aliphatic chain comprising from about 1 to about 35 carbon atoms.

5. The self-releasing fuser member of claim 1, wherein the linking group comprises a saturated or unsaturated hydrocarbon chain having from about 1 to about 30 carbon atoms and contains one or more of an ether group, an ester group, an amide group, an imine group, a silyl ether group, an acid anhydride group, an aromatic ring or a heteroaromatic ring.

6. The self-releasing fuser member of claim 1, wherein $R_f$ is a fully fluorinated aliphatic fluorocarbon chain having the formula $(CF_2)_nCF_3$ and n is 0 to about 20.

7. The self-releasing fuser member of claim 1, wherein $R_f$ comprises at least one unsaturated carbon-carbon bond.

8. The self-releasing fuser member of claim 1, wherein $R_f$ is branched.

9. The self-releasing fuser member of claim 1, wherein the fluoropolymer comprises a fluoroelastomer comprising a copolymer of vinylindenefluoride and hexafluoropropylene or tetrafluoroethylene; a terpolymer of vinylindenefluoride, hexafluoropropylene and tetrafluoroethylene; or a tetrapolymer of vinylindenefluoride, hexafluoropropylene tetrafluoroethylene and a cure site monomer.

10. The self-releasing fuser member of claim 1, wherein the fluoropolymer comprises a fluoroelastomer comprising a tetrapolymer of vinylindenefluoride, hexafluoropropylene tetrafluoroethylene and a cure site monomer.

11. The self-releasing fuser member of claim 1, wherein the outer layer polymer matrix comprises at least one of perfluoroalkoxy, polytetrafluoroethylene, and fluorinated ethylene propylene resin.

12. An oil-less image forming apparatus for forming images on a recording medium comprising:
   a charge-retentive surface to receive an electrostatic latent image thereon;
   a development component to apply toner to the charge-retentive surface to develop an electrostatic latent image to form a developed image on the charge-retentive surface;
   a transfer component to transfer the developed image from the charge retentive surface to a copy substrate; and
   the self-releasing fuser member according to claim 1.

* * * * *